United States Patent [19]

Kameshima et al.

[11] Patent Number: 4,765,650
[45] Date of Patent: Aug. 23, 1988

[54] VEHICLE REAR SUSPENSION

[75] Inventors: Tetsuya Kameshima; Toshiro Kondo; Hiroo Shimoe, all of Hiroshima, Japan

[73] Assignee: Mazda Motor Corporation, Japan

[21] Appl. No.: 22,277

[22] Filed: Mar. 5, 1987

[30] Foreign Application Priority Data

Mar. 6, 1986 [JP] Japan ................................. 61-49411
Mar. 6, 1986 [JP] Japan ................................. 61-49412
Mar. 6, 1986 [JP] Japan ................................. 61-49413
Mar. 6, 1986 [JP] Japan ................................. 61-49414

[51] Int. Cl.⁴ ............................................. B60G 11/20
[52] U.S. Cl. .................................. 280/723; 280/661; 280/688; 280/717
[58] Field of Search ............... 280/723, 689, 688, 690, 280/695, 700, 717, 721, 723, 701, 661, 673; 267/57 R, 57.1, 63 R

[56] References Cited

U.S. PATENT DOCUMENTS 3,520,554  7/1970  Ravenel ............................. 280/673
4,625,995 12/1986  Aubry et al. ....................... 280/723

FOREIGN PATENT DOCUMENTS

58-58906  4/1983  Japan.
59-133305 9/1984  Japan.

Primary Examiner—Richard A. Bertsch
Attorney, Agent, or Firm—Gerald J. Ferguson, Jr.

[57] ABSTRACT

In a rear suspension comprising left and right wheel supports for supporting left and right rear wheels for rotation, a cross member connected to the wheel supports at opposite ends, left and right trailing arms which are connected to the cross member at the rear ends and to the vehicle body at the front ends by way of elastic members for vertical swinging motion and longitudinal displacement and a lateral rod which is connected to the cross member at one end by way of an elastic member and to the vehicle body at the other end by way of an elastic member, nonlinear toe characteristics of the outer rear wheel are obtained by selecting the positions of the junctions of the trailing arms to the vehicle body and the cross member, the position of the lateral rod, and the elastic characteristics of the elastic members.

12 Claims, 11 Drawing Sheets

VEHICLE REAR SUSPENSION

BACKGROUND OF THE INVENTION

1. Field of the Invention

This invention relates to a torsion-axle type rear suspension for a vehicle.

2. Description of the Prior Art

Figure 21:
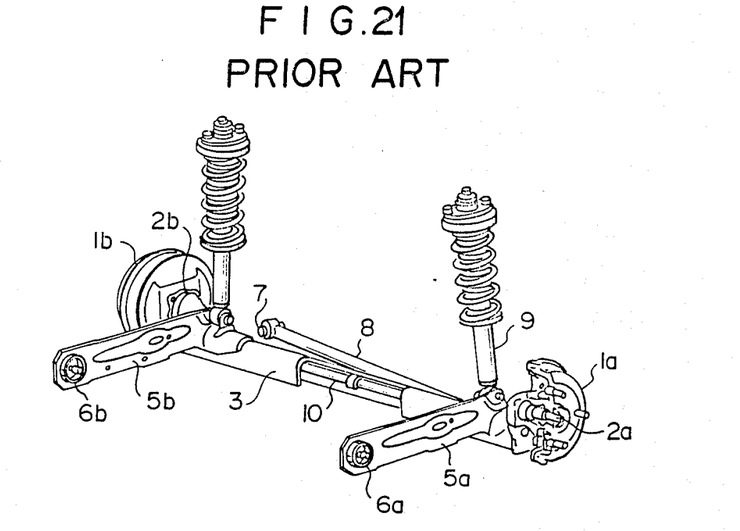
FIGS. 21 and 22 are views respectively similar to FIGS. 1 and 2 but showing the rear suspension of the prior art.
Figure 22:
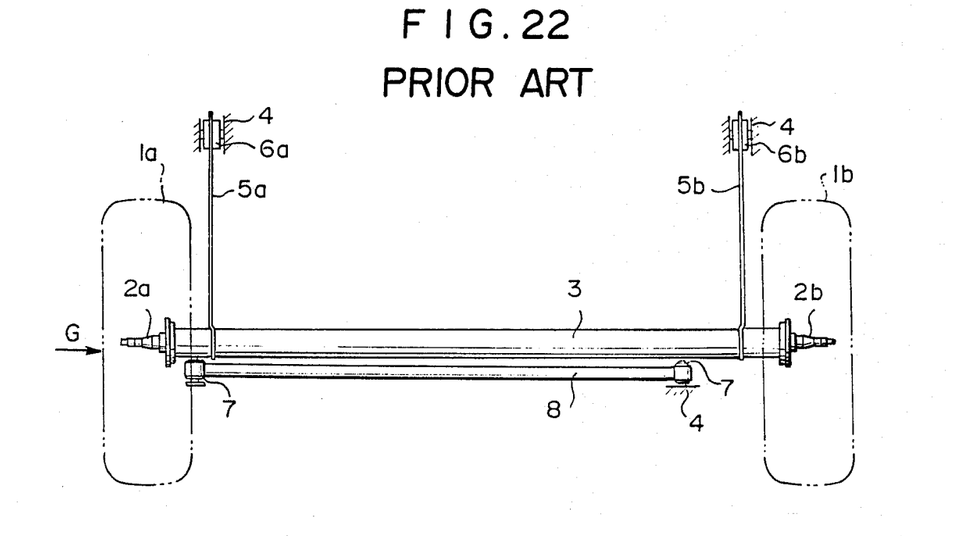

There has been known a torsion-axle type rear suspension as disclosed in, for instance, Japanese Unexamined Utility Model publication No. 58(1983)-58906. As shown in prior art FIGS. 21 and 22 of the present application, the torsion-axle type rear suspension generally comprises left and right wheel supports 2a and 2b for supporting left and right rear wheels 1a and 1b for rotation, a cross member 3 which extends in the transverse direction of the vehicle body and is connected to the wheel supports 2a and 2b at opposite ends, left and right trailing arms 5a and 5b which are fixed to the cross member 3 at the rear ends and connected to the vehicle body 4 at the front ends by way of elastic members 6a and 6b for vertical swinging motion and longitudinal displacement and a lateral rod 8 which is connected to the cross member 3 at one end by way of one elastic member 7 and to the vehicle body 4 at the other end by way of another elastic member 7. The lower ends of shock absorbers 9 which are connected to the vehicle body at the upper ends are connected to the respective junctions of the trailing arms 5a and 5b to the cross member 3. A torsion bar 10 extends inside the cross member 3.

It is generally preferred in order to improve running performance of the vehicle that the toe of the rear wheels in addition to turn of the front wheels in response to turn of the steering wheel. For example, when the steering wheel is turned by a slight angle while the vehicle runs straight, it is preferred that the outer (with respect to the turning direction) rear wheel be caused to toe in to generate understeer tendency, thereby improving running stability of the vehicle. On the other hand, during hard cornering, it is preferred that the outer rear wheel be caused to toe out to weaken strong understeer tendency especially in the case of a front-engine front-drive type vehicle in which understeer tendency is stronger. In another aspect, it is generally preferred that when the steering wheel is turned while the vehicle runs at a low speed, the outer rear wheel be caused to toe out to improve heading performance of the vehicle. On the other hand, during hard cornering or lane change at a high speed, it is preferred that the outer rear wheel be caused to toe in to ensure running stability.

Such behavior of the outer rear wheel can be obtained by controlling the toe of the rear wheel according to the side force that is generated by change of centripetal acceleration and acts on the rear wheel when the steering wheel is turned. However, in the case of the conventional torsion-axle type rear suspension, when side force acts on the rear wheel, the rear wheel is merely caused to toe in or toe out depending on whether the lateral rod is mounted on the vehicle body on the front side or the rear side of the line of action of the side force. That is, when a side force G acts on the rear wheels 1a and 1b in FIG. 22, a rightward rotating moment is generated since the lateral rod 8 is mounted on the vehicle body 4 on the rear side of the line of action of the side force G, and accordingly, the right trailing arm 5b is displaced rearward under deformation of the elastic member 6b while the left trailing arm 5a is displaced forward under deformation of the elastic member 6a, whereby the rear wheels 1a and 1b are turned rightward and the left rear wheel 1a toes in. Though the elastic members 7 on the ends of the lateral rod 8 are also deformed by the side force G, this deformation only displaces the cross member in the transverse direction of the vehicle body and does not affect the toe of the left rear wheel 1a since the trailing arms 5a and 5b are parallel to each other. When the lateral rod 8 is on the front side of the line of action of the side force G, the left rear wheel 1a is caused to toe out as can be understood from the description above. At any rate, the rear wheel only toes out or in when the side force G acts thereon and increase of the side force G with increase in the centripetal acceleration only increases the degree of the toe-in or toe-out.

SUMMARY OF THE INVENTION

In view of the foregoing observations and description, a first object of the present invention is to provide a rear suspension in which the outer rear wheel can be caused to toe in when the side force that is produced by centripetal acceleration and acts thereon is relatively weak and be caused to toe out when the side force is relatively strong.

A second object of the present invention is to provide a rear suspension in which the outer rear wheel can be caused to toe out when the side force that is produced by centripetal acceleration and acts thereon is relatively weak and be caused to toe in when the side force is relatively strong.

This invention is based on the fact that the position of the instantaneous center of rotational displacement of the rear wheel generated by the side force can be freely controlled by selecting the position of the left and right trailing arms, and in accordance with the present invention, nonlinear toe characteristics are obtained by a suitable combination of toe changes of the rear wheel depending on the position of the trailing arms and depending on the position of the lateral rod and the elastic characteristics of the elastic members for connecting the lateral rod to the vehicle body and the cross member. That is, nonlinear toe characteristics of the rear wheel are obtained by selecting the positions of the junctions of the trailing arms to the vehicle body and the cross member, the position of the lateral rod and the elastic characteristics of the elastic members.

The first object of the present invention is accomplished by a rear suspension comprising left and right wheel supports for supporting left and right rear wheels for rotation, a cross member connected to the wheel supports at opposite ends, left and right trailing arms which are connected to the cross member at the rear ends and to the vehicle body at the front ends by way of elastic members for vertical swinging motion and longitudinal displacement and a lateral rod which is connected to the cross member at one end by way of an elastic member and to the vehicle body at the other end by way of an elastic member, characterized in that the left and right trailing arms are disposed so that the space therebetween is larger at the front ends than at the rear ends, the lateral rod is connected to the vehicle body on the front side of the line joining the wheel centers of the left and right rear wheels, and each of the elastic members for connecting the lateral rod to the vehicle body and to the cross member has such elastic characteristics as to be soft in a small displacement range and to be hard in a large displacement range.

In accordance with this arrangement, since the rear wheels (a rigid body including the rear wheels, the cross member and the wheel supports) are supported by the trailing arms disposed so that the space therebetween is larger at the front ends than at the rear ends, the instantaneous center of the displacement of the rear wheel generated by side force acting thereon is on the rear side of the line joining the wheel centers of the left and right rear wheels. This means that if the rear wheel is supported solely by the trailing arm, the rear wheel is displaced in the direction of toe-in. (Since this is based on the concept of the instantaneous center, such a displacement occurs only within a small displacement range.) On the other hand, since the lateral rod is connected to the vehicle body on the front side of the line joining the wheel centers, the rear wheel is displaced in the direction of toe-out when the side force governed by the lateral rod acts thereon. However, since the elastic members connecting the lateral rod to the vehicle body and the cross member are soft in the small displacement range and hard in the large displacement range, the influence of the lateral rod on the toe of the rear wheel is small when the side force acting on the rear wheel is relatively weak and is large when the side force is relatively strong. Accordingly, the rear wheel is caused to toe in under the influence of the trailing arm when the side force is relatively weak, and is caused to toe out when the side force is increased and the influence of the lateral rod overcomes the influence of the trailing arm.

The first object can also be accomplished by a rear suspension of the same type characterized in that the left and right trailing arms are disposed so that the space therebetween is larger at the rear ends than at the front ends, the lateral rod is connected to the vehicle body on the rear side of the line joining the wheel centers of the left and right rear wheels, and each of the elastic members for connecting the lateral rod to the vehicle body and to the cross member has such elastic characteristics as to be hard in a small displacement range and to be soft in a large displacement range.

In accordance with this arrangement, since the rear wheels (a rigid body including the rear wheels, the cross member and the wheel supports) are supported by the trailing arms disposed so that the space therebetween is larger at the rear ends than at the front ends, the instantaneous center of the displacement of the rear wheel generated by side force acting thereon is on the front side of the line joining the wheel centers of the left and right rear wheels. This means that if the rear wheel is supported solely by the trailing arm, the rear wheel is displaced in the direction of toe-out. (Since this is based on the concept of the instantaneous center, such a displacement occurs only within a small displacement range.) On the other hand, since the lateral rod is connected to the vehicle body on the rear side of the line joining the wheel centers, the rear wheel is displaced in the direction of toe-in when the side force governed by the lateral rod acts thereon. However, since the elastic members connecting the lateral rod to the vehicle body and the cross member are hard in the small displacement range and soft in the large displacement range, the influence of the lateral rod on the toe of the rear wheel is large when the side force acting on the rear wheel is relatively weak and is small when the side force is relatively strong. Accordingly, the rear wheel is caused to toe in under the influence of the lateral rod when the side force is relatively weak, and is caused to toe out when the side force is increased and the influence of the trailing arm overcomes the influence of the lateral rod.

The second object can be accomplished by a rear suspension of the same type characterized in that the left and right trailing arms are disposed so that the space therebetween is larger at the front ends than at the rear ends, the lateral rod is connected to the vehicle body on the front side of the line joining the wheel centers of the left and right rear wheels, and each of the elastic members for connecting the lateral rod to the vehicle body and to the cross member has such elastic characteristics as to be hard in a small displacement range and to be soft in a large displacement range.

In accordance with this arrangement, since the rear wheels (a rigid body including the rear wheels, the cross member and the wheel supports) are supported by the trailing arms disposed so that the space therebetween is larger at the front ends than at the rear ends, the instantaneous center of the displacement of the rear wheel generated by side force acting thereon is on the rear side of the line joining the wheel centers of the left and right rear wheels. This means that if the rear wheel is supported solely by the trailing arm, the rear wheel is displaced in the direction of toe-in. (Since this is based on the concept of the instantaneous center, such a displacement occurs only in a small displacement range.) On the other hand, since the lateral rod is connected to the vehicle body on the front side of the line joining the wheel centers, the rear wheel is displaced in the direction of toe-out when the side force governed by the lateral rod acts thereon. However, since the elastic members connecting the lateral rod to the vehicle body and the cross member are hard in the small displacement range and soft in the large displacement range, the influence of the lateral rod on the toe of the rear wheel is large when the side force acting on the rear wheel is relatively weak and is small when the side force is relatively strong. Accordingly, the rear wheel is caused to toe out under the influence of the lateral rod when the side force is relatively weak, and is caused to toe in when the side force is increased and the influence of the trailing arm overcomes the influence of the lateral rod.

The second object can be also accomplished by a rear suspension of the same type characterized in that the left and right trailing arms are disposed so that the space therebetween is larger at the rear ends than at the front ends, the lateral rod is connected to the vehicle body on the rear side of the line joining the wheel centers of the left and right rear wheels, and each of the elastic members for connecting the lateral rod to the vehicle body and to the cross member has such elastic characteristics as to be soft in a small displacement range and to be hard in a large displacement range.

In accordance with this arrangement, since the rear wheels (a rigid body including the rear wheels, the cross member and the wheel supports) are supported by the trailing arms disposed so that the space therebetween is larger at the rear ends than at the front ends, the instantaneous center of the displacement of the rear wheel generated by side force acting thereon is on the front side of the line joining the wheel centers of the left and right rear wheels. This means that if the rear wheel is supported solely by the trailing arm, the rear wheel is displaced in the direction of toe-out. (Since this is based on the concept of the instantaneous center, such a displacement occurs only within a small displacement range.) On the other hand, since the lateral rod is connected to the vehicle body on the rear side of the line joining the wheel centers, the rear wheel is displaced in the direction of toe-in when the side force governed by the lateral rod acts thereon. However, since the elastic members connecting the lateral rod to the vehicle body and the cross member are soft in the small displacement range and hard in the large displacement range, the influence of the lateral rod on the toe of the rear wheel is small when the side force acting on the rear wheel is relatively weak and is large when the side force is relatively strong. Accordingly, the rear wheel is caused to toe out under the influence of the trailing arm when the side force is relatively weak, and is caused to toe in when the side force is increased and the influence of the lateral rod overcomes the influence of the trailing arm.

The lateral rod may be connected to the cross member and the vehicle body at opposite ends both by way of the elastic members, or may be connected to the cross member and the vehicle body at opposite ends one end by way of the elastic member the other end without elastic member.

Further, since the line joining the wheel centers is slightly displaced from the line of action of the side force acting on the rear wheel by amount of pneumatic trail, the term "the line joining the wheel centers" as used in this specification should be interpreted to mean the line of action of the side force acting on the rear wheel in the strict sense of the term.

DESCRIPTION OF THE PREFERRED EMBODIMENTS

Figure 1:
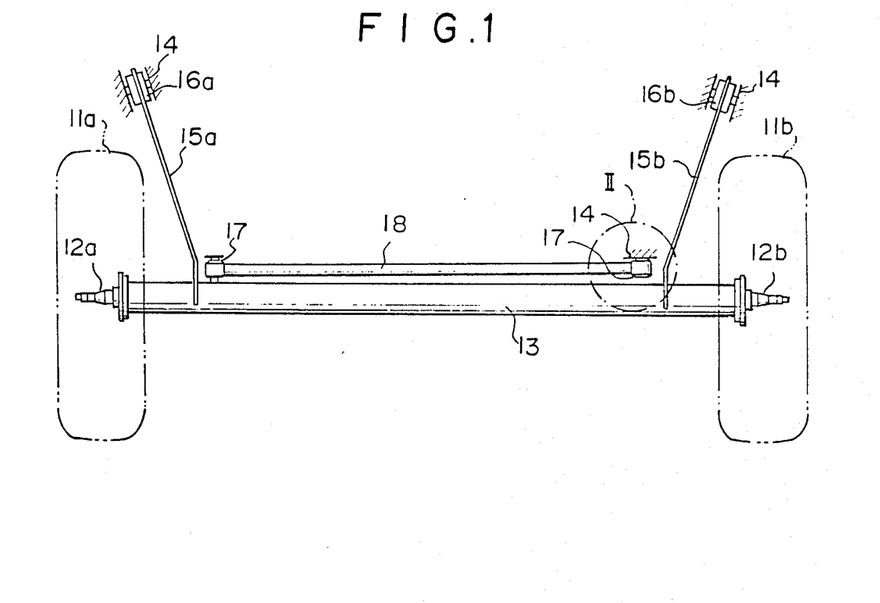
FIG. 1 is a fragmentary plan view showing a rear suspension in accordance with a first embodiment of the present invention.

In FIG. 1, a rear suspension in accordance with a first embodiment of the present invention comprises left and right wheel supports 12a and 12b for supporting left and right rear wheels 11a and 11b for rotation, a cross member 13 which extends in the transverse direction of the vehicle body and is connected to the wheel supports 12a and 12b at opposite ends, left and right trailing arms 15a and 15b which are fixed to the cross member 13 at the rear ends and connected to the vehicle body 14 at the front ends by way of elastic members 16a and 16b for vertical swinging motion and longitudinal displacement and a lateral rod 18 which is connected to the cross member 13 at one end by way of one elastic member 17 and to the vehicle body 14 at the other end by way of another elastic member 17.

The trailing arms 15a and 15b diverge away from each other toward the front ends thereof at which the trailing arms 15a and 15b are connected to the vehicle body 14, and accordingly, the space therebetween is larger at the front ends than at the rear ends. The cross member 13 is disposed so that the central axis thereof is aligned with the line joining the wheel centers of the left and right rear wheels 11a and 11b, and the lateral rod 18 is connected to the vehicle body 14 on the front side of the cross member 13.

Figure 2:
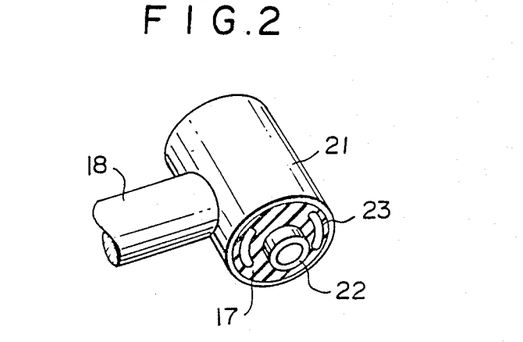
FIG. 2 is an enlarged perspective view showing a part of the rear suspension of the first embodiment.
Figure 3:
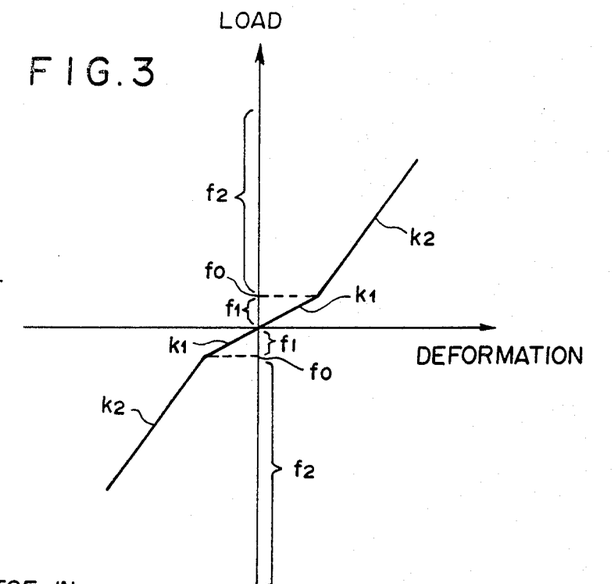
FIG. 3 is a graph showing the elastic characteristics of the elastic member employed in the first embodiment.

The elastic member 17 for connecting the lateral rod 18 to the vehicle body 14 comprises, as shown in FIG. 2, a rubber body filling the space between an outer tubular member 21 integrally formed on the end of the lateral rod 18 and an inner tubular member 22 fixed to the vehicle body 14. The elastic member 17 is provided with a pair of arcuate through holes 23 extending through the rubber body on the left and right side of the inner tubular member 22 in parallel to the central axis thereof. By virtue of the through holes 23, the relation between the lateral load acting on the elastic member 17 and the deformation of the elastic member 17 changes at a preset load $f_0$ as shown in FIG. 3. That is, the elastic member 17 is soft (spring constant of k1) in the small displacement range and hard (spring constant of k2) in the large displacement range.

The operation of the rear suspension of this embodiment will be described with reference to FIGS. 4 and 5, hereinbelow.

Figure 4:
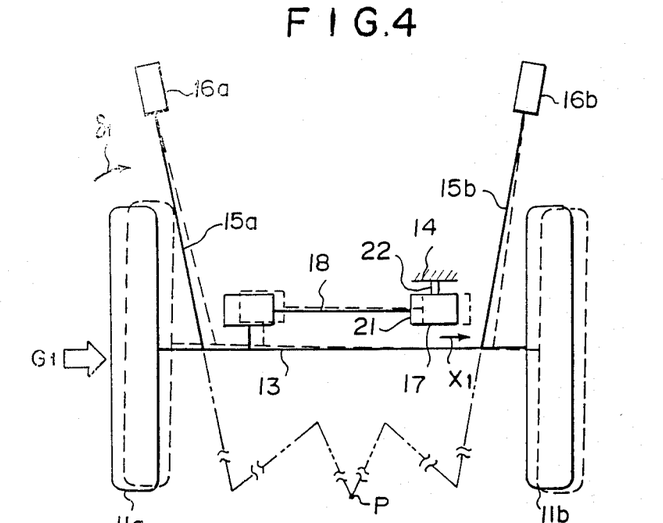
FIGS. 4 and 5 are schematic plan views for illustrating the operation of the first embodiment.
Figure 5:
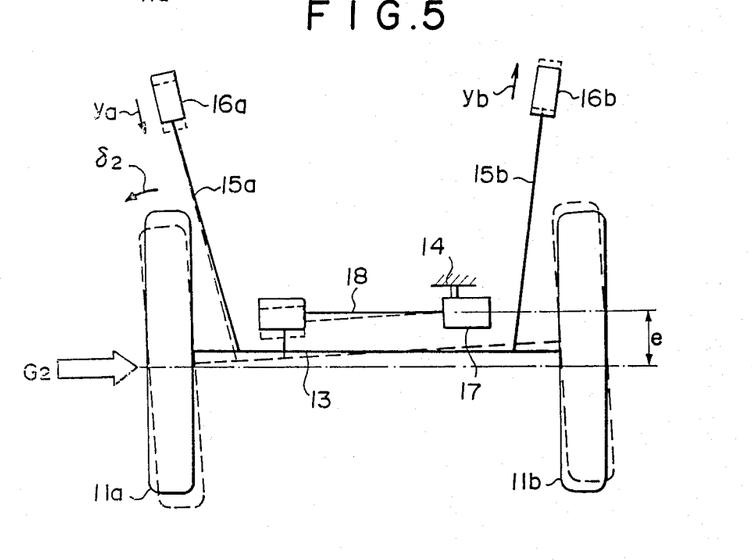

In FIG. 4, it is assumed that side force G1 generated by a relatively small centripetal acceleration acts on the rear wheels 11a and 11b due to slight rightward turning of the steering wheel during straight forward travel or the like. Since the trailing arms 15a and 15b diverge away from each other toward the front ends, the instantaneous center of the rotational displacement of the cross member 13 and the rear wheels 11a and 11b (These may be considered to form a rigid body.) supported by the trailing arms 15a and 15b may be considered to be on the intersection P of the rearward extensions of the longitudinal axes of the trailing arms. Since the elastic member 17 is soft (spring constant of k1) in the range $f_1$ in which a relatively weak side force acts thereon as shown in FIG. 3, the lateral rod 18 is immediately displaced in the direction of arrow X1 in FIG. 4 and the influence of the lateral rod 18 on the toe of the rear wheels 11a and 11b (urging the rear wheels to rotate in the counterclockwise direction in FIG. 4, i.e., urging the outer rear wheel 11a to toe out) is negligible in this situation. Accordingly, the rear wheels 11a and 11b are displaced as shown by the broken line in FIG. 4 under the rotational moment about the instantaneous center P. Thus, the outer rear wheel 11a is caused to toe in ($\delta_1$) with respect to the original position.

In the range $f_2$ (FIG. 3) in which a stronger side force G2 acts on the rear wheels 11a and 11b, the elastic member 17 is hard (spring constant of k2), and accordingly, the influence of the lateral rod 18 on the toe of the rear wheels 11a and 11b urging the rear wheels 11a and 11b to rotate in the counterclockwise direction is enlarged. (The force urging the rear wheels 11a and 11b in the counterclockwise direction is due to a counterclockwise rotational moment which is generated by virtue of the fact that the junction of the lateral rod 18 to the vehicle body 14 is forwardly spaced from the line of action of the side force G2 by a distance e). Accordingly, the rear wheels 11a and 11b are displaced as shown by the broken line in FIG. 5 and thus the outer rear wheel 11a is caused to toe out ($\delta_2$). That is, the outer rear wheel 11a is caused to toe out by $\delta_2-\delta_1$ with respect to the original position shown by the solid line in FIG. 4.

Figure 6:
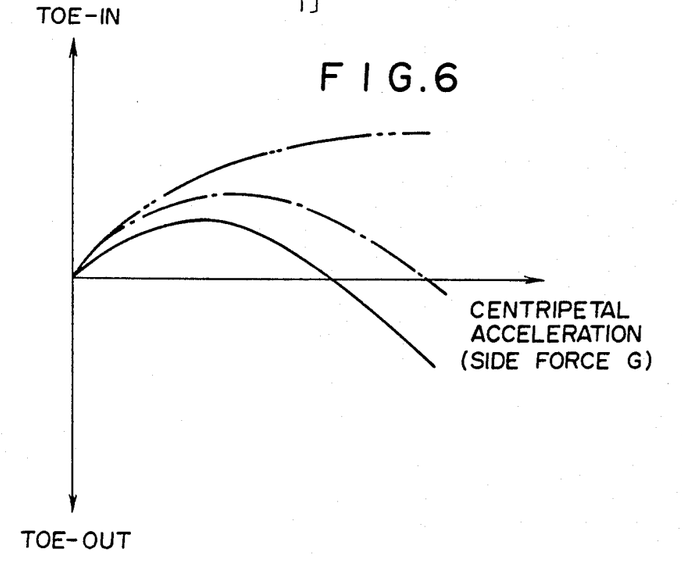
FIG. 6 is a graph for illustrating the toe characteristics obtained by the first embodiment.
Figure 7:
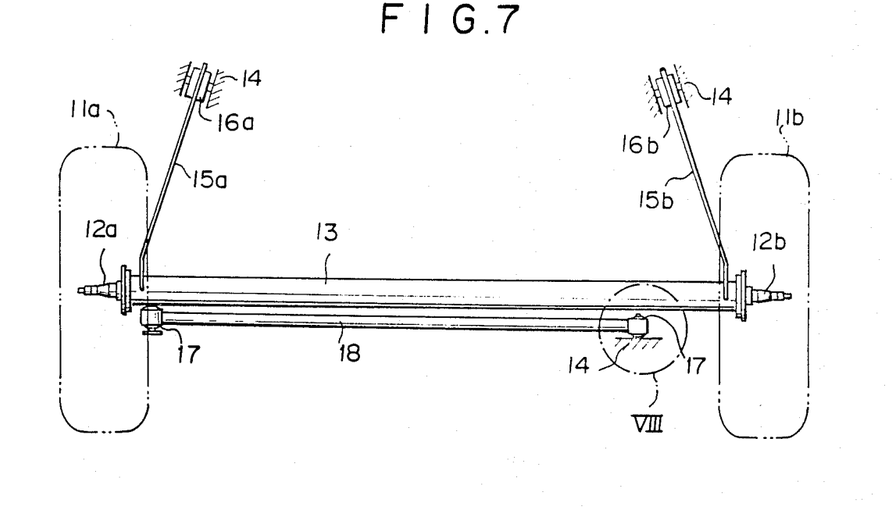
FIGS. 7 to 11 are views respectively similar to FIGS. 1 to 5 but for a second embodiment of the present invention.

FIG. 6 shows the toe characteristics of the outer rear wheel 11a with respect to the centripetal acceleration or the side force G.

As shown by the solid line, when a relatively weak side force acts on the outer rear wheel 11a due to a small centripetal acceleration generated, for instance, when the steering wheel is turned by a small angle during a straight travel, the outer rear wheel 11a is caused to toe in, and when a relatively strong side force acts on the outer rear wheel 11a due to a large centripetal acceleration generated, for instance, during a hard cornering, the outer rear wheel 11a is caused to toe out. As described above, this effect is obtained by virtue of the characteristics of the elastic member 17, the position of the junction of the lateral rod 18 to the vehicle body 14, and the positions of the junctions of the trailing arms 15a and 15b to the vehicle body 14 and the cross member 13. By changing the selection of the these items, various toe characteristics of the outer rear wheel 11a can be obtained as shown by the chained lines in FIG. 6.

Now a second embodiment of the present invention will be described with reference to FIGS. 7 to 11, hereinbelow.

In FIGS. 7 to 11, the parts analogous to the parts shown in FIGS. 1 to 6 are given the same reference numerals and the following description will focus mainly on the difference between the first embodiment and the second embodiment. In this embodiment, the left and right trailing arms 15a and 15b diverge away from each other toward the rear ends and the lateral rod 18 is connected to the vehicle body 14 on the rear side of the cross member 13.

Figure 8:
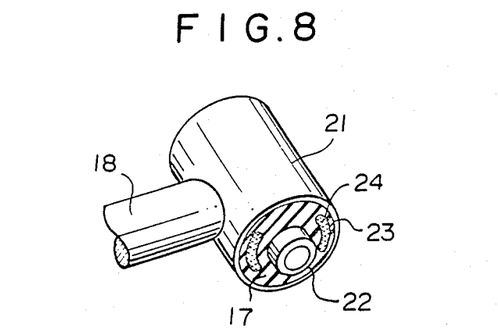
Figure 9:
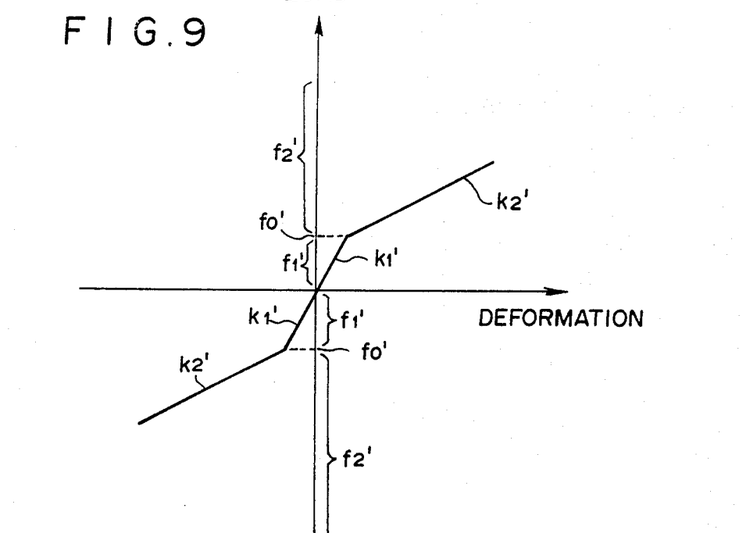

As shown in FIG. 8, a resin plate 24 is press-fit into each through hole 23 of the rubber body of the elastic member 17. By virtue of the resin plates 24 inserted into the through holes 23, the relation between the lateral load acting on the elastic member 17 and the deformation of the elastic member 17 changes at a preset load $f_0'$ as shown in FIG. 9. That is, the elastic member 17 is hard (spring constant of $k1'$) in the small displacement range and soft (spring constant of $k2'$) in the large displacement range.

The operation of the rear suspension of this embodiment will be described with reference to FIGS. 10 and 11, hereinbelow.

Figure 10:
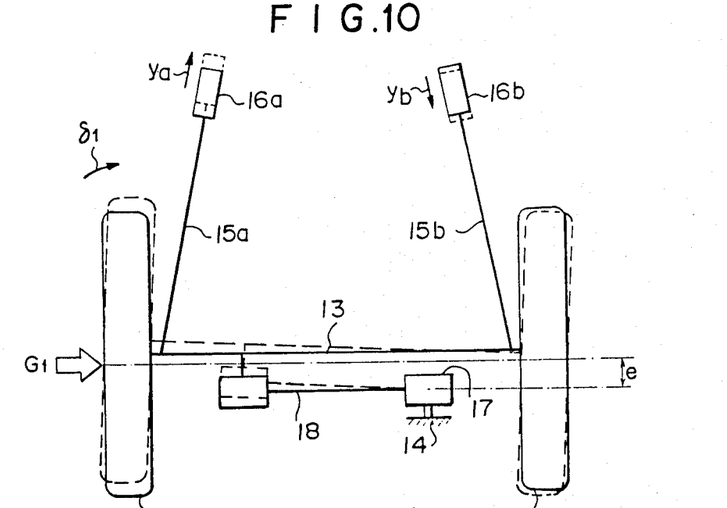

In FIG. 10, it is assumed that side force G1 generated by a relatively small centripetal acceleration acts on the rear wheels 11a and 11b due to slight rightward turning of the steering wheel during straight forward travel or the like. Since the elastic member 17 is hard (spring constant of $k1'$) in the range $f_1'$ in which a relatively weak side force acts thereon as shown in FIG. 10, the influence of the lateral rod 18 on the toe of the rear wheels 11a and 11b urging the rear wheels 11a and 11b to rotate in the clockwise direction is large. (The force urging the rear wheels 11a and 11b in the clockwise direction is due to a clockwise rotational moment which is generated by virtue of the fact that the junction of the lateral rod 18 to the vehicle body 14 is rearwardly spaced from the line of action of the side force G1 by a distance e.) Accordingly, the rear wheels 11a and 11b are displaced as shown by the broken line in FIG. 10 and thus the outer rear wheel 11a is caused to toe in($\delta_1$).

Figure 11:
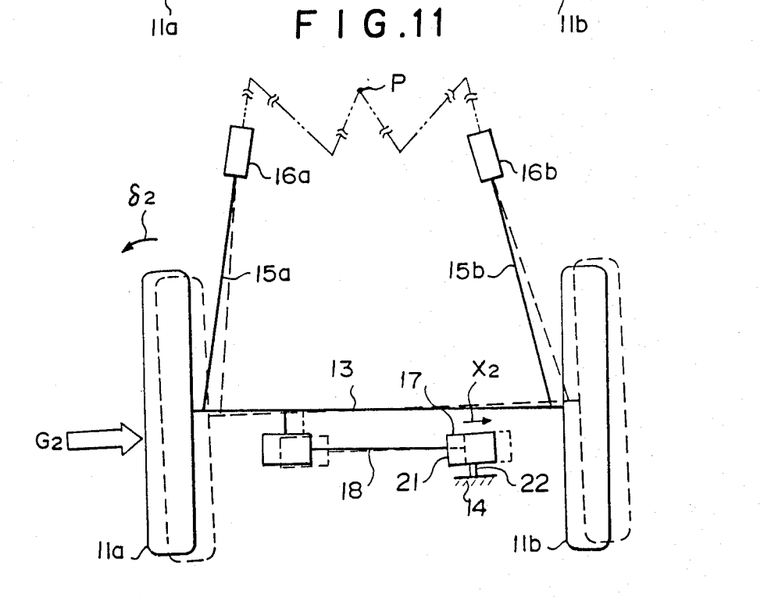

In the range $f_2'$ (FIG. 9) in which a stronger side force G2 acts on the rear wheels 11a and 11b, the elastic member 17 is soft (spring constant of $k2'$), and accordingly, the lateral rod 18 is immediately displaced in the direction of arrow X2 in FIG. 11 and the influence of the lateral rod 18 on the toe of the rear wheels 11a and 11b (urging the rear wheels to rotate in the clockwise direction in FIG. 11, i.e., urging the outer rear wheel 11a to toe in) is negligible in this situation. Since the trailing arms 15a and 15b diverge away from each other toward the rear ends, the instantaneous center of the rotational displacement of the cross member 13 and the rear wheels 11a and 11b (These may be considered to form a rigid body.) supported by the trailing arms 15a and 15b may be considered to be on the intersection P of the forward extensions of the longitudinal axes of the trailing arms. Accordingly, the rear wheels 11a and 11b are displaced as shown by the broken line in FIG. 11 under the counterclockwise rotational moment about the instantaneous center P. Thus, the outer rear wheel 11a is caused to toe out ($\delta_2$). That is, the outer rear wheel 11a is caused to toe out by $\delta_2-\delta_1$ with respect to the original position shown by the solid line in FIG. 10.

Also in this embodiment, the toe characteristics of the outer rear wheel 11a with respect to the centripetal acceleration or the side force G can be as shown in FIG. 6.

A third embodiment of the present invention will be described with reference to FIGS. 12 to 16, hereinbelow.

Figure 12:
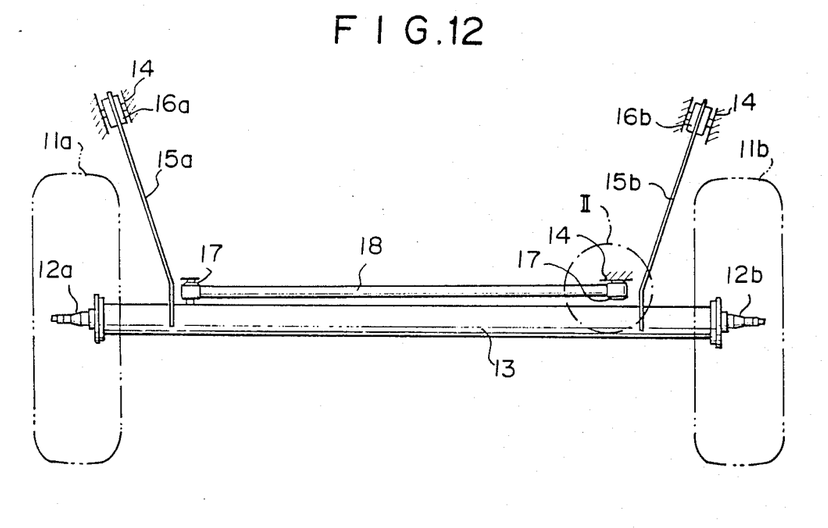
FIGS. 12 to 16 are views respectively similar to FIGS. 1, 2, 4, 5 and 6 but for a third embodiment of the present invention.
Figure 13:
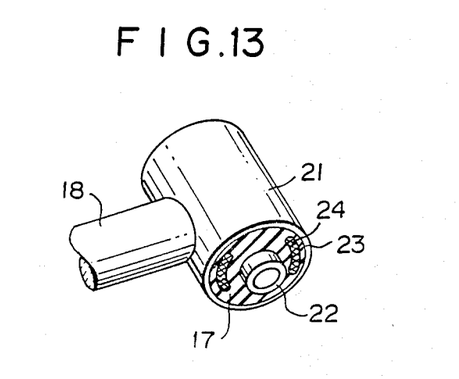

FIGS. 12 and 13 are views similar to FIGS. 1 and 2 but showing the third embodiment of the present invention. As can be seen from FIGS. 12 and 13, in this embodiment, the trailing arms 15a and 15b and the lateral rod 18 are disposed in the same manner as the first embodiment, and the elastic member 17 is of the same structure as the one shown in FIG. 8. Accordingly the rear suspension of this embodiment will be described herebelow only with respect to its operation.

Figure 14:
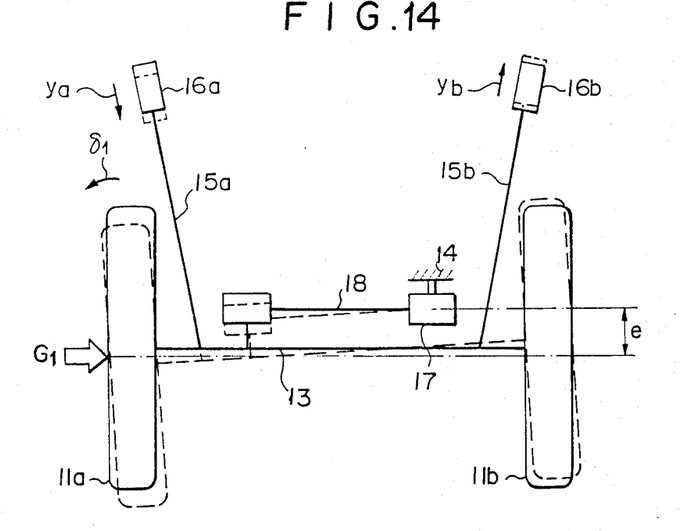

In FIG. 14, it is assumed that side force G1 generated by a relatively small centripetal acceleration acts on the rear wheels 11a and 11b due to rightward turning of the steering wheel during low speed travel or the like. Since the elastic member 17 is hard (spring constant of $k1'$) in the range $f_1'$ in which a relatively weak side force acts thereon as shown in FIG. 14, the influence of the lateral rod 18 on the toe of the rear wheels 11a and 11b urging the rear wheels 11a and 11b to rotate in the counterclockwise direction is large. (The force urging the rear wheels 11a and 11b in the counterclockwise direction is due to a counterclockwise rotational moment which is generated by virtue of the fact that the junction of the lateral rod 18 to the vehicle body 14 is forwardly spaced from the line of action of the side force G1 by a distance e.) Accordingly, the rear wheels 11a and 11b are displaced as shown by the broken line in FIG. 14 and thus the outer rear wheel 11a is caused to toe out ($\delta_1$).

Figure 15:
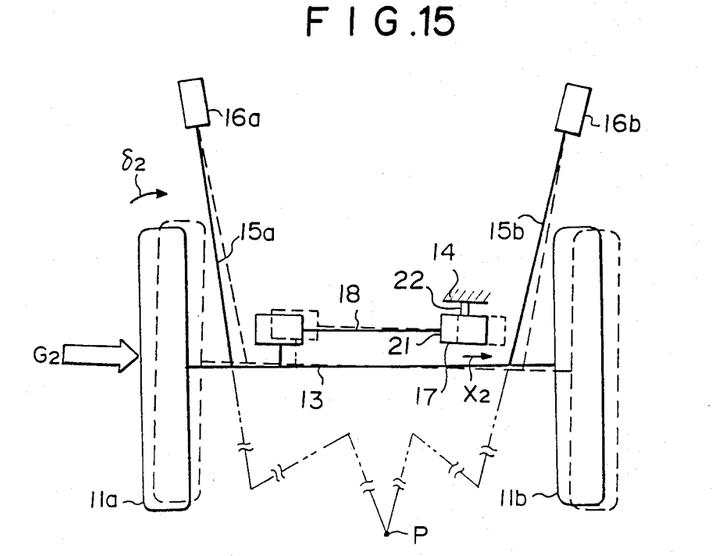

In the range $f_2'$ (FIG. 9) in which a stronger side force G2 acts on the rear wheels 11a and 11b, the elastic member 17 is soft (spring constant of $k2'$), and accordingly, the lateral rod 18 is immediately displaced in the direction of arrow X2 in FIG. 15 and the influence of the lateral rod 18 on the toe of the rear wheels 11a and 11b (urging the rear wheels to rotate in the counterclockwise direction in FIG. 14, i.e., urging the outer rear wheel 11a to toe out) is negligible in this situation. Since the trailing arms 15a and 15b diverge away from each other toward the front ends, the instantaneous center of the rotational displacement of the cross member 13 and the rear wheels 11a and 11b (These may be considered to form a rigid body.) supported by the trailing arms 15a and 15b may be considered to be on the intersection P of the rearward extensions of the longitudinal axes of the trailing arms. Accordingly, the rear wheels 11a and 11b are displaced as shown by the broken line in FIG. 15 under the clockwise rotational moment about the instantaneous center P. Thus, the outer rear wheel 11a is caused to toe in ($\delta_2$). That is, the outer rear wheel 11a is caused to toe in by $\delta_2-\delta_1$ with respect to the original position shown by the solid line in FIG. 14.

Figure 16:
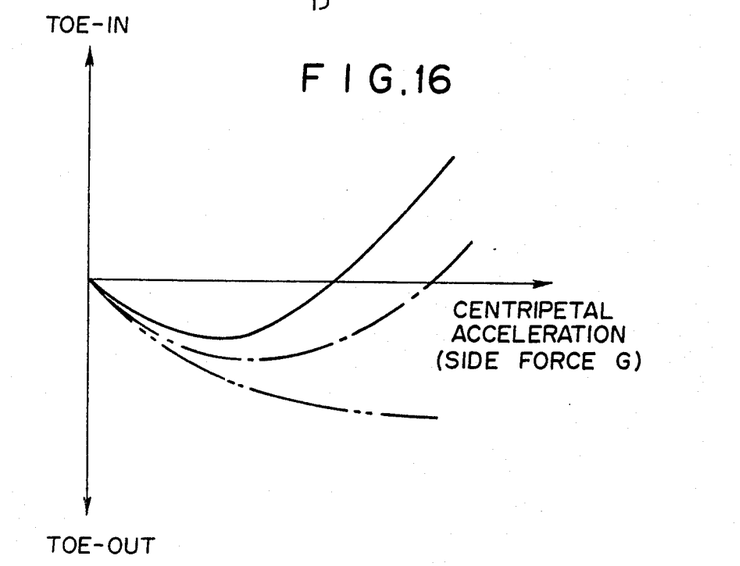

FIG. 16 shows the toe characteristics of the outer rear wheel 11a with respect to the centripetal acceleration or the side force G in the third embodiment.

As shown by the solid line, when a relatively weak side force acts on the outer rear wheel 11a due to a small centripetal acceleration, for instance, during cornering at a low to middle speed, the outer rear wheel 11a is caused to toe out, and when a relatively strong side force acts on the outer rear wheel 11a due to a large centripetal acceleration, for instance, during lane change at a high speed, the outer rear wheel 11a is caused to toe in. As described above, this effect is obtained by virtue of the characteristics of the elastic member 17, the position of the junction of the lateral rod 18 to the vehicle body 14, and the positions of the junctions of the trailing arms 15a and 15b to the vehicle body 14 and the cross member 13. By changing the selection of the these items, various toe characteristics of the outer rear wheel 11a can be obtained as shown by the chained lines in FIG. 16.

A fourth embodiment of the present invention will be described with reference to FIGS. 17 and 18, hereinbelow.

Figure 17:
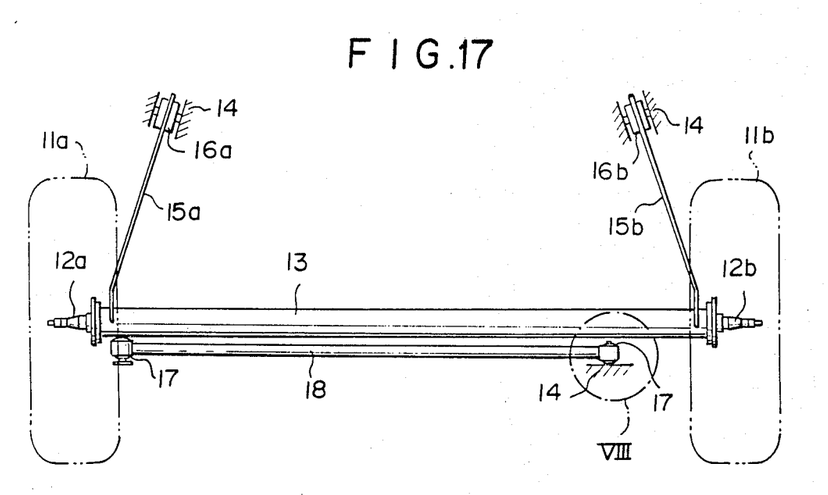
FIGS. 17 to 20 are views respectively similar to FIGS. 1, 2, 4 and 5 but for a fourth embodiment of the present invention.
Figure 18:
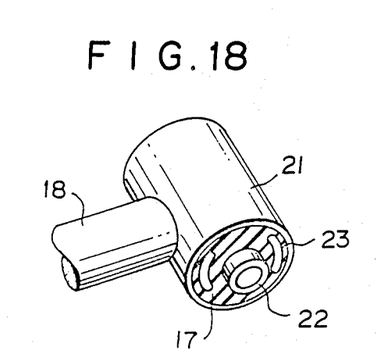

FIGS. 17 and 18 are views similar to FIGS. 1 and 2 but showing the fourth embodiment of the present invention. As can be seen from FIGS. 17 and 18, in this embodiment, the trailing arms 15a and 15b, the lateral rod 18 are disposed in the same manner as the second embodiment and the elastic member 17 is of the same structure as one shown in FIG. 2. Accordingly the rear suspension of this embodiment will be described herebelow only with respect to its operation.

Figure 19:
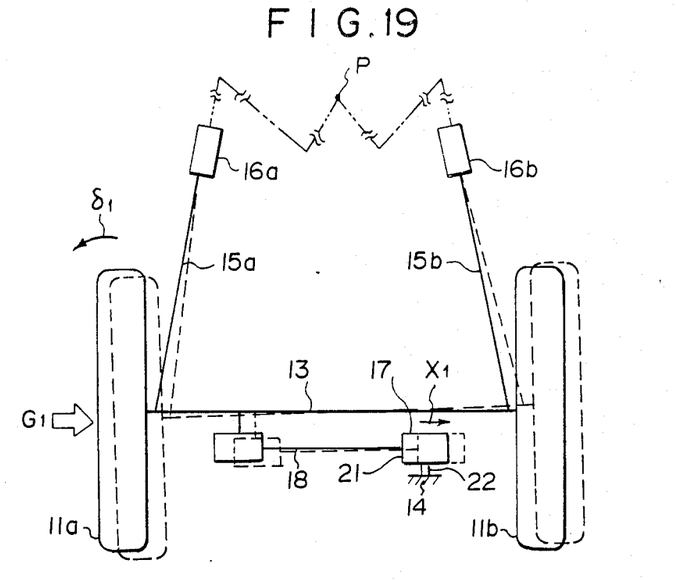

In FIG. 19, it is assumed that side force G1 generated by a relatively small centripetal acceleration acts on the rear wheels 11a and 11b due to rightward turning of the steering wheel during a low speed travel or the like. Since the trailing arms 15a and 15b diverge away from each other toward the rear ends, the instantaneous center of the rotational displacement of the cross member 13 and the rear wheels 11a and 11b (These may be considered to form a rigid body.) supported by the trailing arms 15pi a and 15b may be considered to be on the intersection P of the forward extensions of the longitudinal axes of the trailing arms. Since the elastic member 17 is soft (spring constant of k1) in the range $f_1$ in which a relatively weak side force acts thereon as shown in FIG. 3, the lateral rod 18 is immediately displaced in the direction of arrow X1 in FIG. 19 and the influence of the lateral rod 18 on the toe of the rear wheels 11a and 11b (urging the rear wheels to rotate in the clockwise direction in FIG. 19, i.e., urging the outer rear wheel 11a to toe in) is negligible in this situation. Accordingly, the rear wheels 11a and 11b are displaced as shown by the broken line in FIG. 19 under the rotational moment about the instantaneous center P. Thus, the outer rear wheel 11a is caused to toe out ($\delta_1$) with respect to the original position.

Figure 20:
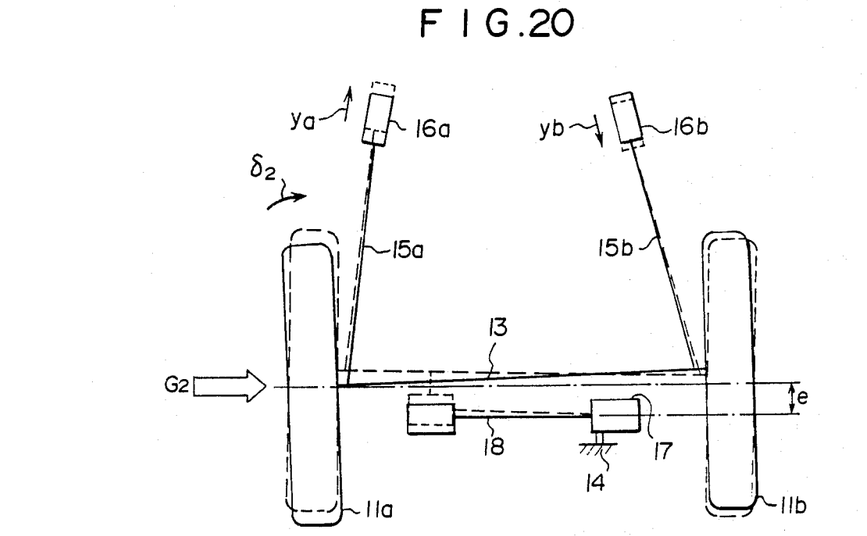

In the range $f_2$ (FIG. 3) in which a stronger side force G2 acts on the rear wheels 11a and 11b, the elastic member 17 is hard (spring constant of k2), and accordingly, the influence of the lateral rod 18 on the toe of the rear wheels 11a and 11b urging the rear wheels 11a and 11b to rotate in the clockwise direction is enlarged. (The force urging the rear wheels 11a and 11b in the clockwise direction is due to a clockwise rotational moment which is generated by virtue of the fact that the junction of the lateral rod 18 to the vehicle body 14 is rearwardly spaced from the line of action of the side force G2 by a distance e.) Accordingly, the rear wheels 11a and 11b are displaced as shown by the broken line in FIG. 20 and thus the outer rear wheel 11a is caused to toe in ($\delta_2$). That is, the outer rear wheel 11a is caused to toe in by $\delta_2-\delta_1$ with respect to the original position shown by the solid line in FIG. 20.

Also in this embodiment, the toe characteristics of the outer rear wheel 11a with respect to the centripetal acceleration or the side force G can be as shown in FIG. 16.

Though the operation of each of the first to fourth embodiments has been described above on the assumption that only the elastic member 7 connecting the lateral rod 18 to the vehicle body 14 of the two elastic members 7 on opposite ends of the lateral rod 18 is deformed, the same operation and effect can be obtained even if both the elastic members 17 are deformed.

We claim:

1. A rear suspension comprising left and right wheel supports for supporting left and right rear wheels for rotation, a cross member connected to the wheel supports at opposite ends, left and right trailing arms which are connected to the cross member at the rear ends and to the vehicle body at the front ends by way of elastic members for vertical swinging motion and longitudinal displacement and a lateral rod which is connected to the cross member at one end and to the vehicle body at the other end, at least one of the ends of the lateral rod being connected to the corresponding member by way of an elastic member, characterized in that the left and right trailing arms are disposed so that the space therebetween is larger at the front ends than at the rear ends, the lateral rod is connected to the vehicle body on the front side of the line joining the wheel centers of the left and right rear wheels, and the elastic member for connecting the lateral rod has such elastic characteristics as to be soft in the transverse direction of the vehicle body in a small displacement range and to be hard in the same direction in a large displacement range, the turning rear wheel being caused to toe-in when the side force is small, the toe-in tendency of the turning rear wheel being weakened when the side force is large.

2. A rear suspension as defined in claim 1 in which said elastic member for connecting the lateral rod comprises an inner tubular member fixedly connected to the corresponding member, an outer tubular member which is fixed to the end of the lateral rod and in which the inner tubular member is received, and a rubber bushing inserted between the inner and outer tubular members.

3. A rear suspension as defined in claim 2 in which said rubber bushing is provided with at least one hole.

4. A rear suspension comprising left and right wheels supports for supporting left and right rear wheels for rotation, a cross member connected to the wheel supports at opposite ends, left and right trailing arms which are connected to the cross member at the rear ends and to the vehicle body at the front ends by way of elastic members for vertical swinging motion and longitudinal displacement and a lateral rod which is connected to the cross member at one end and to the vehicle body at the other end, at least one of the ends of the lateral rod being connected to the corresponding member by way of an elastic member, characterized in that the left and right trailing arms are disposed so that the space therebetween is larger at the rear ends than at the front ends, the lateral rod is connected to to the vehicle body on the rear side of the line joining the wheel centers of the left and right rear wheels, and the elastic member for connecting the lateral rod has such elastic characteristics as to be hard in the transverse direction of the vehicle body in a small displacement range and to be soft in the same direction in a large displacement range, the turning rear wheel being caused to toe-in when the side force is small, the toe-in tendency of the turning rear wheel being weakened when the side force is large.

5. A rear suspension as defined in claim 4 in which said elastic member for connecting the lateral rod comprises an inner tubular member fixedly connected to the corresponding member, an outer tubular member which is fixed to the end of the lateral rod and in which the inner tubular member is received, and a rubber bushing inserted between the inner and outer tubular members.

6. A rear suspension as defined in claim 5 in which said rubber bushing is provided with a hole and a spacer is press-fit into the hole.

7. A rear suspension comprising left and right wheel supports for supporting left and right rear wheels for rotation, a cross member connected to the wheel supports at opposite ends, left and right trailing arms which are connected to the cross member at the rear ends and to the vehicle body at the front ends by way of elastic members for vertical swinging motion and longitudinal displacement and a lateral rod which is connected to the cross member at one end and to the vehicle body at the other end, at least one of the ends of the lateral rod being connected to the corresponding member by way of an elastic member, characterized in that the left and right trailing arms are disposed so that the space therebetween is larger at the front ends than at the rear ends, the lateral rod is connected to the vehicle body on the front side of the line joining the wheel centers of the left and right rear wheels, and the elastic member for connecting the lateral rod has such elastic characteristics as to be hard in the transverse direction of the vehicle body in a small displacement range and to be soft in the same direction in a large displacement range, the turning rear wheel being caused to toe out when the side force is small, the toe-out tendency being weakened when the side force is large.

8. A rear suspension as defined in claim 7 in which said elastic member for connecting the lateral rod comprises an inner tubular member fixedly connected to the corresponding member, an outer tubular member which is fixed to the end of the lateral rod and in which the inner tubular member is received, and a rubber bushing inserted between the inner and outer tubular members.

9. A rear suspension as defined in claim 8 in which said rubber bushing is provided with at least one hole and a spacer is press-fit into the hole.

10. A rear suspension comprising left and right wheels supports for supporting left and right rear wheels for rotation, a cross member connected to the wheel supports at opposite ends, left and right trailing arms which are connected to the cross member at the rear ends and to the vehicle body at the front ends by way of elastic members for vertical swinging motion and longitudinal displacement and a lateral rod which is connected to the cross member at one end and to the vehicle body at the other end, at least one of the ends of the lateral rod being connected to the corresponding member by way of an elastic member, characterized in that the left and right trailing arms are disposed so that the space therebetween is larger at the rear ends than at the front ends, the lateral rod is connected to the vehicle body on the rear side of the line joining the wheel centers of the left and right rear wheels, and the elastic member for connecting the lateral rod has such elastic characteristics as to be soft in the transverse direction of the vehicle body in a small displacement range and to be hard in the same direction in a large displacement range, the turning rear wheel being caused to toe out when the side force is small, the toe-out tendency being weakened when the side force is large.

11. A rear suspension as defined in claim 10 in which said elastic member for connecting the lateral rod comprises an inner tubular member fixedly connected to the corresponding member, an outer tubular member which is fixed to the end of the lateral rod and in which the inner tubular member is received, and a rubber bushing inserted between the inner and outer tubular members.

12. A rear suspension as defined in claim 11 in which said rubber bushing is provided with at least one hole.

* * * * *